US012789467B2

(12) United States Patent
Patterson et al.

(10) Patent No.: US 12,789,467 B2
(45) Date of Patent: Nov. 10, 2026

(54) TECHNIQUES TO DETERMINE IMPROVED PRINT CONFIGURATIONS IN HYBRID MANUFACTURING

(71) Applicant: XEROX CORPORATION, Norwalk, CA (US)

(72) Inventors: Matt Patterson, Raleigh, NC (US); Saigopal Nelaturi, Mountain View, CA (US); Morad Behandish, San Mateo, CA (US)

(73) Assignee: XEROX CORPORATION, Norwalk, CT (US)

(*) Notice: Subject to any disclaimer, the term of this patent is extended or adjusted under 35 U.S.C. 154(b) by 993 days.

(21) Appl. No.: 17/869,393

(22) Filed: Jul. 20, 2022

(65) Prior Publication Data

US 2024/0025124 A1 Jan. 25, 2024

(51) Int. Cl.
*B29C 64/393* (2017.01)
*B29C 64/40* (2017.01)
(Continued)

(52) U.S. Cl.
CPC ............ *B29C 64/393* (2017.08); *B29C 64/40* (2017.08); *B33Y 30/00* (2014.12); *B33Y 50/02* (2014.12)

(58) Field of Classification Search
CPC ..... B29C 64/393; B29C 64/40; B29C 64/386; B33Y 30/00; B33Y 50/02; B33Y 50/00;
(Continued)

(56) References Cited

U.S. PATENT DOCUMENTS 11,635,747 B2 * 4/2023 Schwartz ........... G05B 19/4099 700/98
11,698,623 B2 * 7/2023 Coffman ................ G06N 20/20 700/98
(Continued)

FOREIGN PATENT DOCUMENTS

CN 112238603 A * 1/2021 ........... B29C 64/106
CN 112966410 A * 6/2021 ............. G06F 30/23
(Continued)

OTHER PUBLICATIONS

Nezhad et al., "Pareto-based optimization of part orientation in stereolithography", 2010, pp. 1591-1598, downloaded from https://journals.sagepub.com/doi/abs/10.1243/09544054jem 1842 (Year: 2010).*
(Continued)

*Primary Examiner* — Robert E Fennema
*Assistant Examiner* — Olvin Lopez Alvarez
(74) *Attorney, Agent, or Firm* — MH2 TECHNOLOGY LAW GROUP LLP

(57) ABSTRACT

The present disclosure provides techniques for determining a configuration for 3D printing a 3D object. An example method includes obtaining user input parameters describing one or more user objectives. The method also includes computing, by a processing device, a graph of hybrid manufacturing (HM) configurations based in part on the user input parameters, wherein the graph comprises a plurality of nodes corresponding to different configurations for manufacturing the 3D object, wherein each node corresponds with a favorable print configuration with respect to two or more figures of merit. The method also includes displaying a selected HM configuration corresponding to a selected node of the plurality of nodes.

20 Claims, 7 Drawing Sheets

(51) Int. Cl.
*B33Y 30/00* (2015.01)
*B33Y 50/02* (2015.01)

(58) Field of Classification Search
CPC ...... G05B 2219/35215; G05B 19/4099; G06F 2111/06; G06F 2113/10; G06F 2119/18; G06F 30/12; G06F 30/17; B22F 10/385; B22F 10/47; B22F 10/80
See application file for complete search history.

(56) References Cited

U.S. PATENT DOCUMENTS

| | | | | |
|---|---|---|---|---|
| 2019/0366644 | A1* | 12/2019 | Blaier | G06F 30/00 |
| 2020/0150623 | A1* | 5/2020 | Bandara | G05B 19/182 |
| 2020/0264589 | A1* | 8/2020 | Reinhart | G05B 19/41865 |
| 2020/0265122 | A1* | 8/2020 | Razzell | G06F 30/17 |
| 2021/0406412 | A1* | 12/2021 | Cramer | G06F 30/20 |
| 2022/0193774 | A1* | 6/2022 | Mirzendehdel | B22F 10/28 |
| 2023/0211561 | A1* | 7/2023 | Agarwal | G06F 30/12 |

FOREIGN PATENT DOCUMENTS

| | | | | |
|---|---|---|---|---|
| EP | 3206100 | A1 * | 8/2017 | G05B 19/4097 |
| JP | 2005025445 | A * | 1/2005 | |
| WO | WO-2019070644 | A2 * | 4/2019 | G06F 30/17 |
| WO | WO-2019180466 | A1 * | 9/2019 | B29C 64/386 |

OTHER PUBLICATIONS

Amir M. Mirzendehdel et al.(Topology Optimization with Accessibility Constraint for Multi-Axis Machining), 2020, pp. 1-19. downloaded from https://www.sciencedirect.com/science/article/pii/S001044852030018X (Year: 2020).*

Multiobjective Evolutionary Algorithms: A Comparative Case Study and the Strength Pareto Approach, 1999, pp. 257-271 , downloaded from https://ieeexplore.ieee.org/abstract/document/797969 (Year: 1999).*

Gaynor et al.("Topology optimization considering overhang constraints: Eliminating sacrificial support material in additive manufacturing through design"), 2016, pp. 1157-1172, downloaded from https://link.springer.com/article/10.1007/s00158-016-1551-x (Year: 2016).*

Goldin et al., "Approximate bi-criteria search by efficient representation of subsets of the Pareto-optimal frontier", pp. 10, 2021 downloaded from https://arxiv.org/pdf/2006.10302 (Year: 2021).*

Ulloa et al., (A Simple and Fast Bi-Objective Search Algorithm), 2020 pp. 143-151, downloaded from https://ojs.aaai.org/index.php/ICAPS/article/view/6655 (Year: 2020).*

Yazdi et al.( multi-objective optimization of additive manufacturing (AM ) process), 2018, pp. 152-157, downloaded from https://www.sciencedirect.com/science/article/pii/S2405896318313740 (Year: 2018).*

Wikipedia, "pareto front", 2026, p. 5 downloaded from https://en.wikipedia.org/wiki/Pareto_front (Year: 2026).*

* cited by examiner

TECHNIQUES TO DETERMINE IMPROVED PRINT CONFIGURATIONS IN HYBRID MANUFACTURING

TECHNICAL FIELD

Implementations of the present disclosure relate to additive manufacturing.

BACKGROUND

Additive manufacturing (often known as 3D printing) enables the production of structures that are complicated in shape and not achievable by subtractive manufacturing methods. For example, hollow structures that are expensive or difficult to achieve in machining processes (i.e., removal of materials by turning, drilling, and milling) may be created layer by layer in additive manufacturing. Many forms of additive manufacturing make use of transforming matters from one state to another, such as from liquid to solid, by chemical reactions, or by heat (e.g., melting materials at specific locations and solidifying when cooled).

Some additive manufacturing techniques, such as material jetting or fused deposition modeling (FDM), require support structures to provide a substrate for overhangs (e.g., protrusions of the target shape, when sliced in the production direction, being lack of materials in the previous layer). For example, in material jetting, a layer of photo-sensitive polymer is jetted (similar to ink-jet printing) on a flat surface formed by the previous layer and cured into solid by ultra-violet (UV) light. The flat surface may include the model to be formed as well as support materials necessary to support the polymer in the current layer. The support materials can be removed upon completion, such as by melting or dissolving. In FDM, a molten string of filament is extruded and deposited by a hot-end nozzle into a sliced pattern in each layer, the molten string solidifies after exiting the hot-end nozzle. The same molten string is used to form the support structures for subsequent layers. Upon completion, the support structures can be manually removed in a post processing procedure to uses subtractive manufacturing. The manufacturing of a part using a combination of additive and subtractive techniques may be referred to as hybrid manufacturing (HM).

The support materials, if different from the material, can be expensive in material cost and can increase management complexity. Even when the support structure is of the same material as the printing material, removal can be time-consuming and may cause damage to the target model. Therefore, in either situation, for objects of a certain overall size and shape, the less support structure needed during printing, the lower the cost in materials and time is needed, and the better finish of the printed shape can be achieved.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

Figure 1:
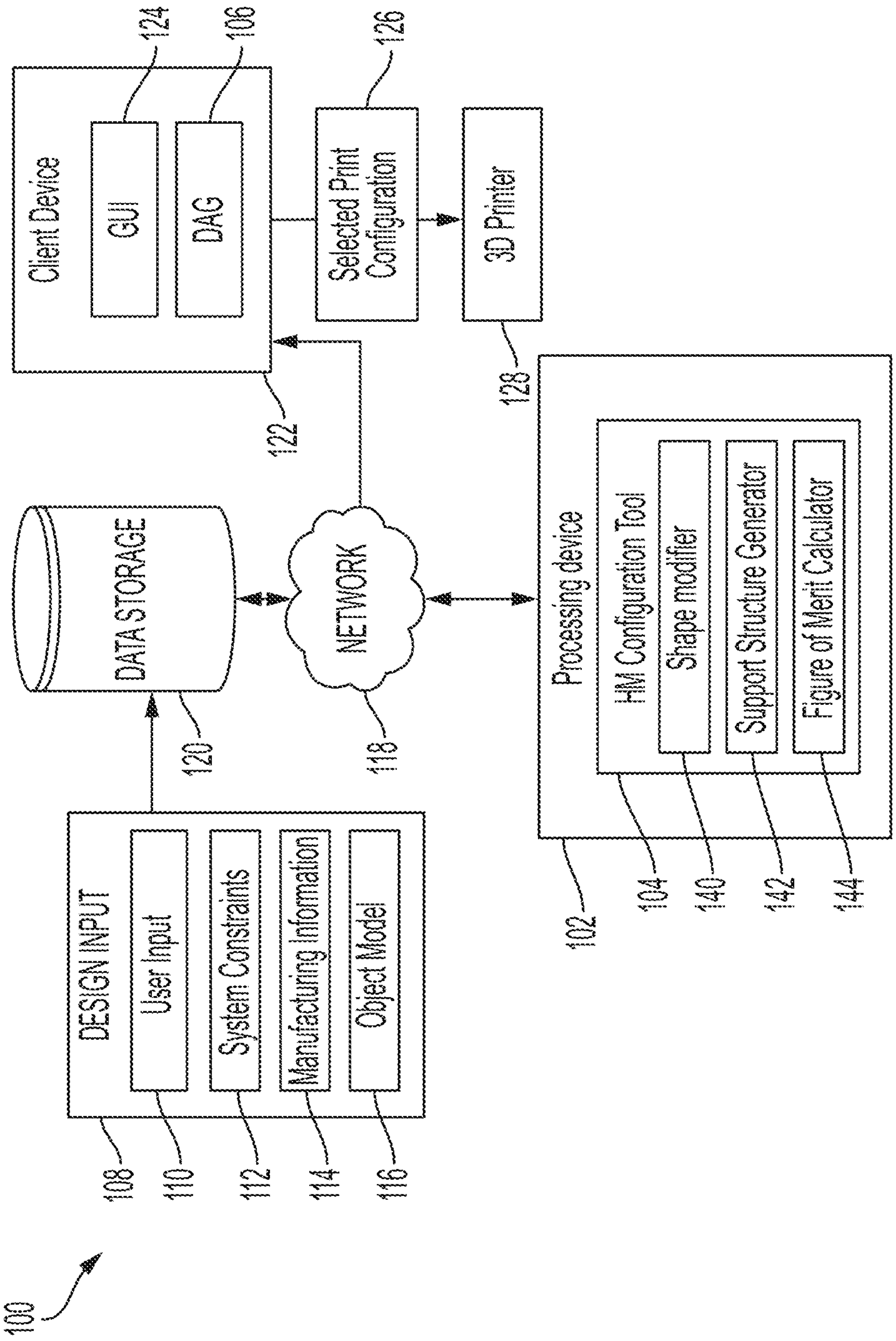
FIG. 1 illustrates a block diagram of a system to generate print configurations for use in hybrid (additive and subtractive) manufacturing, in accordance with some embodiments of the present disclosure.

The present disclosure provides various techniques for helping a user identify a suitable configuration for printing a 3D object. Some factors to consider when 3D printing an object include orientation, presence of support structures, feature modifications, and others. Any of these factors could affect the monetary cost, manufacturing time, and final quality of a 3D printed object. Additionally, the user's objectives with regard to the use of a printed part may have a large effect on what types of modifications can be made to the print configuration, and the final cost of the modifications. For example, if a support structure is added to a surface that must adhere to a certain shape in its final form, then the support structure may have to be removed, adding time and cost to the HM process. On the other hand, if the support structure is added to a surface whose final form is not critical to the function of the part, then it may be possible to leave the support structure in place. All of the various parameters governing cost, time, failure likelihood, and other metrics should be taken into account to obtain an optimal or near optimal print configuration.

The techniques described herein enable a user to select an improved HM configuration in consideration of multiple objectives without having to explicitly define all of the various parameters that govern the outcome. In the field of multi-objective optimization, the Pareto front is the set of all Pareto efficient solutions, wherein a Pareto efficient solution is one in which no single preference criterion can be made better without making another preference criterion worse. If a particular solution is not Pareto efficient, this means that at least one additional solution exists in which all of the preference criterion improve. The use of a Pareto front enables one to make tradeoffs between a set of efficient choices rather than considering the full range of every parameter.

In accordance with presently disclosed techniques, a Pareto-efficient configuration for HM can be generated by determining solutions for a number of factors, including locations within the build volume for all objects to be printed, orientations with respect to the build plane for all parts, the addition of support structures for overhangs and thermal loads, and modifications made to accommodate for thin features, among other possible considerations. Any of the above modifications may be sacrificial (to be removed after 3D printing) or non-sacrificial (to be kept in the final 3D printed part.) Generating a Pareto-efficient configuration for HM also involves determining differences in various figures of merit due to the changes in the print configuration. Examples of figures of merit may include the cost to print (single print and at scale production), time to print (single print and at scale production), likelihood of print failure, cost and time for sacrificial material removal, cost and time for surface post-processing, among other factors.

To enable a user to identify a preferred HM solution for a particular 3D printed object, various HM configuration solutions can be generated, each of which is on the Pareto-front of one or more figures of merit. Each of the HM configurations can be displayed to the user along with additional information such as potential issues, mitigation strategies, and associated costs. In consideration of the presented solutions, the user is then able to use their gained intuition and experience to weigh the benefits of the proposed solutions and to choose from disjoint, internally consistent sets of possible atomic modifications to adopt for their HM process. In this way, the user is relieved of the burden of explicitly declaring all the cost-drivers in the HM process.

Figure 2:
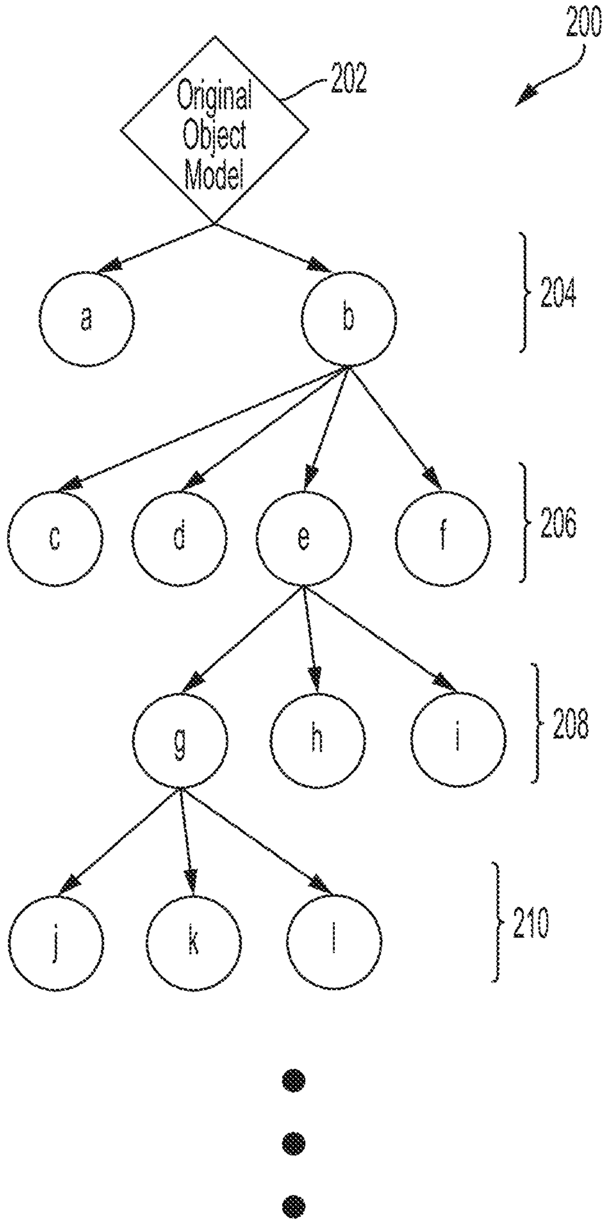
FIG. 2 is an example of a HM configuration graph, in accordance with embodiments.

FIG. 1 illustrates a block diagram of a system to generate print configurations for use in hybrid (additive and subtractive) manufacturing, in accordance with some embodiments of the present disclosure. As shown, the system 100 includes a processing device 102 with a HM configuration tool 104 configured to generate a graph of potential print configurations, which is referred to herein as a direct acyclical graph (DAG) 106. Example DAGs 106 are shown in FIGS. 2 and 4.

The HM configuration tool 104 is configured to generate the graph of HM configurations that the user navigates to select a suitable HM configuration. As used herein, the term HM configuration refers to the configuration details involved in manufacturing a part represented by a 3D model. The HM configuration can include an AM configuration, also referred to herein as print configuration, that details features of the AM process (3D printing). Some or all of the print configuration may be embodied in the modified object model, which describes the object's shape, including any shape modifications, support structures, printing orientations, and others. The print configuration may also include details related to the 3D printer itself, such as the build material, temperature settings, and others. The HM configuration can include an SM configuration, which details features of the SM process, such as machining processes.

The HM configuration tool 104 is configured to automatically generate a plurality of HM configurations that are Pareto efficient with regard to specific figures of merit. The HM configurations may include AM configurations (3D printing configurations) and may optionally include some SM processes and configurations. However, it will be appreciated that the term HM configuration will also include configurations that only include additive manufacturing details.

The HM configuration tool 104 can include a shape modifier 140 that can be used to alter the shape of the 3D object to achieve certain objectives, such as to enlarge structures that are smaller than the minimum feature size capabilities of the 3D printer, provide support for overhangs, add thermal support, and others. The HM configuration tool 104 also includes a support structure generator 142, which is able to add support structures to support overhangs.

The modifications made by the shape modifier 140 and the support structure generator 142 may depend on various user inputs, including the user's selection of surfaces that can or cannot be modified. In cases where the user has not already specified a chosen orientation, the HM configuration tool 104 may generate print configurations for each potential orientation of the 3D printed part. The print configurations may be automatically evaluated by the figure of merit calculator 144. The figure of merit calculator 144 calculates the values for various figures of merit for each configuration, such as cost to print, time to print, print failure likelihood cost of material removal, and others. The most suitable configurations according to each figure of merit may be added to a node of the DAG 106.

The DAG 106 may be generated based at least in part on the design input 108, which may include user input 110, system constraints 112, manufacturing information 114, and an object model 116. The object model 116 describes the 3D object to be printed. For example, the object model may be a computer-aided design (CAD) model (e.g., in AutoCAD™, Solidworks™, STEP, VRML, IGES, or DXF formats), a stereolithography (STL) model or similar point cloud models (e.g., .obj, .x3d, files and the like), or files that can be converted to such files (e.g., .png image files with user-defined thickness information).

The user input 110 can be used to describe the intent or objectives of the user. For example, the user can specify features (surfaces, volumes, etc.) of the 3D object as having special attributes that relate to the 3D object's ultimate use. For example, the user may specify a surface of the 3D object as having a shape that is modifiable or not modifiable. A modifiable surface may be one wherein the surface can be changed within a range of values without altering the function of the 3D object. A surface that is not modifiable may be one that the user expects to engage with a feature of a different 3D object, for example. The user may also specify a surface as one that will be subject to post processing to ensure, for example, that the surface has a particular finish. These user inputs may be used by the HM configuration tool 104 to determine modifications to the object model 116. For example, if a surface is identified by the user as not being modifiable, the HM configuration tool 104 will not generate a print configuration that includes changes to that surface. On the other hand, if the user identifies a surface as being subject to post processing, the HM configuration tool 104 may preferentially select that surface to apply support structure.

The user input 110 may also describe a preferred orientation of the 3D object relative to the build plane or a direction of tensile load to be experienced by the printed 3D object. The direction of tensile load may determine a preferred orientation since the strength of the printed object may be different in different directions depending on the 3D printing technology used. The user may also specify the types of subtractive manufacturing (SM) capabilities accessible to the user. The SM capabilities may be used to enable the HM configuration tool to 104 develop viable HM solutions and determine the associated costs associated with the removal of added structures, for example.

The system constraints 112 refer to limitations of the 3D printing system, such as height range of the 3D printing system (i.e., tallest printable part), minimum feature size, overhang constraints, and others. The system constraints 112 can be used by the HM configuration tool 104 to identify issues in an object model 116, identify mitigation strategies, and identify the corresponding costs of the strategies.

The manufacturing information 114 may include data that enables the HM configuration tool 104 to compute one or more figures of merit for each HM configuration. For example, the manufacturing information 114 may include business knowledge related to the cost of materials, the labor cost and time involved in various AM or SM processes, and others.

Some or all of the design input 108 may be received from a user such as an HM practitioner over a network 118 and stored to a data storage device 120. For example, input design input 108 may be received from the client device 122, which can include a graphical user interface (GUI) 124 for providing input and viewing print configurations. The GUI 124 may display an image of the 3D object created from the object model 116 and enable a user to select features.

The design input 108 may be used to generate a plurality of print configurations, wherein each configuration describes a different set of modifications to the original object model 103. The print configurations may depend on the type of AM process being used.

In AM in general, layers of materials may be added along the build direction (e.g., starting from a build platform). Any material that may solidify into a controlled pattern may form each of the added layers, such as, for example, powder materials to be sintered at high temperatures, extrudable materials to be extruded and solidify, and photosensitive materials to be solidified from liquid by light.

In some AM techniques, deposited (e.g., ejected or extruded) materials require a foundation to rest on (either before or after solidifying). The foundation may be the build platform or the previous printed layer. For certain shapes (e.g., overhangs), the current layer may extend beyond the previous layer and may require additional support. In some cases, a support structure of the same material or a different material may be formed during the printing process to provide the support. Accordingly, the object model 116 may be modified to create a print configuration that includes the 3D object plus the support structures. The support structures may be later removed through an SM manufacturing process or may be kept if they do not interfere with the intended use of the printed part. In some cases, the support for the overhang may be obtained by modifying the shape of the 3D object to eliminate the overhang or reduce the severity of the overhang (e.g., reduce the overhang angle).

The design of the support structures, if used, will depend, at least in part, on the orientation of the 3D object relative to the build platform during the 3D printing process. Accordingly, the HM configuration tool 104 may compute several 3D object modifications with different support strategies (e.g., shape modification and/or adding support structures) for different orientations.

Some AM techniques are also sensitive to thermal loads present within the 3D object during the printing process. For example, in some metal-additive-manufacturing (MAM) techniques, molten droplets of metal are deposited onto the substrate while the build platform is controlled so that the drops land on the substrate in a controlled manner to build the 3D object. As the drops land, they coalesce and merge with the existing substrate and eventually harden into a solid. This process depends on the ability of the heat from the molten drops to dissipate into the surrounding substrate or the build platform. If the thermal load exceeds the ability of the heat to be dissipate, the 3D object could become distorted, possibly leading to build failure.

In some embodiments, the HM configuration tool 104 may create print configurations that reduce thermal loading to acceptable levels by changing the orientation of the 3D object relative the build platform or by changing the shape of the 3D object to add material to increase the heat dissipation and reduce the thermal loading in certain areas.

The identification of suitable HM configurations may be based, at least in part, on the design input 108 such as the user input 110 and system constraints 112. For example, if the user has selected a particular region of the 3D object as unmodifiable, then HM configuration tool can skip all print configurations that would require modifications to that region (e.g., support structures). Additionally, if a portion of the 3D object is too thin according to the minimum size constraints, the HM configuration tool 104 can create several print configurations that mitigate the problem by adding material to different portions of the 3D object. The resulting costs of each modification may depend, in turn, on the user input 110. For example, if the HM configuration tool 104 adds material to an area that the user had identified as modifiable, then post processing may not be needed to remove the added material, which could lead to reduced overall cost and time to manufacture.

For each print configuration, the HM configuration tool 104 computes values for each of the figures of merit (e.g., cost to print, time to print, likelihood of print failure, cost and time for sacrificial material removal, cost and time for surface post-processing, etc.). The computed values may be determined at least in part based on the design input 108 such as the manufacturing information 114.

The values for the figures of merit for all of the print configurations may be used by the HM configuration tool 104 to generate a Pareto front. Those print configurations lying on the Pareto front (for example, at vertices of the Pareto front) may be selected for generating the DAG 106 such that each node of the DAG 106 corresponds with one of the Pareto efficient print configurations.

The DAG 106 may be used by a graphical user interface 124 to present the various print configurations to the user. The print configuration display may include an image of the modified 3D object, including any changes to the shape and any support structures. The print configuration display may also include the figures of merits associated with each print configuration. The user can select different print configurations for display by navigating through the DAG 106.

Once the user has made a decision about which print configuration is preferred by the user, the user can select the HM configuration for printing, and the selected print configuration may be sent to a 3D printer 128 for printing. It will also be appreciated that additional processing may be required to transform the selected print configuration into a form used by a specific 3D printer. For example, a program referred to as a slicer may transform the file from a CAD or STL file to a G-code file.

Although the processing device 102 and the client device 122 are illustrated as two separate devices, in some cases, the processing device 102 and the client device 122 may be included in a same computational system (or two modules on a common computational platform). In some embodiments, the GUI 124 may be included as a component of the HM configuration tool 104. In some cases, the client device 122 may be a consumer terminal (e.g., a personal computer, a smart phone, etc.) that enables a user to upload designs and relevant information to the data storage 140, and the processing device 102 may behave as a server performing requested services to generate the DAG 106 and present the DAG 106 and associated print configurations via the network 118. It will be appreciated that other computing system configurations may be used to implement the techniques described herein without deviating from the scope of the present disclosure.

FIG. 2 is an example of a HM configuration graph, in accordance with embodiments. In this example, the print configuration graph 200 is a directed acyclical graph (DAG) comprising a plurality of nodes, including root node 202 and additional nodes labeled a-l (where nodes j, k, and l are leaf nodes. The root node 202 represents the original object model. Each leaf node may represent a complete HM solution for creating the 3D object and may be a Pareto efficient solution. Intermediate nodes a-j represent decision nodes, which are selectable by the user and form a decision path from the original object model (root node 202) to the full HM solution (one of the leaf nodes j, k, l). Each intermediate node may represent a partial HM configuration. For example, the nodes c, d, e, and, f may represent different printing orientations of the 3D object, but not information about the support structures or shape modifications.

The example graph of FIG. 2 shows three decision levels 204-280 and a single leaf node level 210. Each successive decision level may represent a more specific HM solution. For example, the first decision level 204 may represent a decision regarding a particular 3D printing technology or material. In such an example, node a may be selected to indicate a polymer build material, whereas node b may be selected to indicate a molten metal build material. The selection of a particular decision node may open up additional decision pathways.

After each selection, the HM configuration tool 104 may compute additional information that may be passed down to subsequent decision nodes. For example, the second decision level 206 may represent a selection of an orientation. Once a particular orientation is selected, the HM configuration tool may generate a new STL file that transforms the 3D object from the original orientation in the original object model to the new orientation that was selected.

The third selection level 208 may represent different material support strategies, which will depend on the particular orientation selected. Each node at this level may represent a different type of support, including the addition of specific support structures to the object model, or shape modifications to the object model that may reduce the need for additional support structures. The supports strategies may be determined, at least in part, based on the user input indicating which surfaces of the object are modifiable, for example.

The fourth level 210 may relate to subtractive manufacturing (SM) options that may be used to create the finished part. In this embodiment, the fourth level 210 includes the leaf nodes, each of which represents a complete HM solution which describes the print job and the post printing processes to be performed. Each leaf node may be associated with the final object file (e.g., STL file) for that node, which indicates the orientation of the object, any shape modifications to be added, and support structures to be added. Each leaf node may also be associated with a set of digital artifacts providing a description of the AM/SM processes to be performed in accordance with that node.

In some embodiments, there may be additional decision layers. For example, at the fourth selection level 210 the user may select a particular type or types of SM techniques are available (e.g., CNC, Dremel kit, manual, etc.). This user selection may open additional nodes.

Each node, including the leaf nodes may also be associated with a value for each of several figures of merits such as cost to print, total fabrication cost, time to print, time to complete fabrication, and others. The figures of merit may be computed based on estimates informed by the selections made by the user at higher levels in the graph. The presented nodes at each level may represent the Pareto efficient solutions identified up to that point.

The GUI presented to the user may be generated based, at least in part, on the print configuration graph. The GUI enables the user to navigate the graph based on the selection of specific decision nodes until arriving at a complete HM solution (leaf node). At each stage a visual display can be presented to the user, which shows the current 3D object model as well as the values for the various figures of merit. This allows the user to more easily comprehend the various decisions so that they can apply their own intuition and expertise about the most suitable configuration given the user's goals.

In some embodiments, the entire HM configuration graph can be completed ahead of time, taking into account all possible user selections. In other embodiments, certain portions of the graph may not be computed until the user has selected a node that is a parent to that portion of the HM configuration graph, thereby saving on processing resources.

It will be appreciated that the HM configuration graph shown in FIG. 2 is only one example among several possible configurations. For example, the decisions represented at each level are only examples which may be different depending on the details of a specific implementation. For example, in some examples, the user may not be given a choice of build material, in which case, the first decision level would be skipped. Additionally, the number of decision layers or the number of nodes per layer may be different from what is shown in FIG. 2. Any number of changes may be made to the HM configuration graph while remaining within the scope of the present claims.

Figure 3:
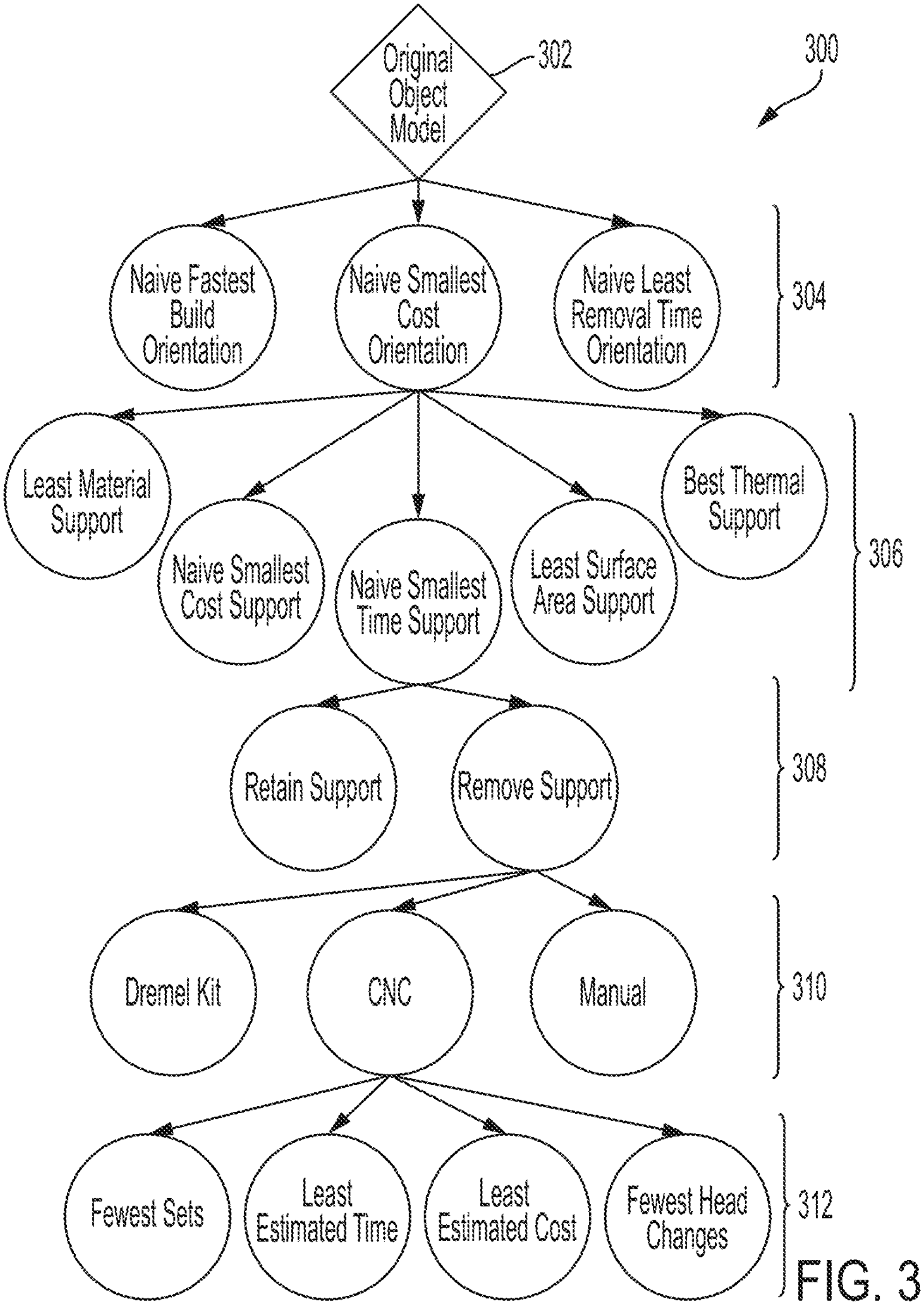
FIG. 3 is a more detailed example of a HM configuration graph, in accordance with embodiments.

FIG. 3 is a more detailed example of a HM configuration graph, in accordance with embodiments. In this embodiment, the first decision layer 304 below the root node 302 includes three selectable orientations, each of which represents a more suitable orientation with regard to a specific figure of merit, including a fastest build time, smallest cost, a least material removal time. For example, the orientation with the fastest build time is referred to as "naive fastest build orientation." The use of the word naive is meant to indicate that the computations involve estimates computed with imperfect information. In many cases, the user may later make additional selections that provide additional information about the build cost, build time, etc.

The second decision layer 306 describes several support strategies which represent a more suitable support strategy with regard to specific figures of merit given the selected orientation. In this embodiment, the figures of merit include the support with the least material, smallest cost, smallest time to print, least surface area, and best thermal performance. However, it will be appreciated that these are examples, and that several additional figures of merit could be considered.

In some embodiments, each orientation node in the first decision layer 304 includes one or more child nodes, which may be the same child nodes but with different values for each figure of merit. The figure of merits values at the child nodes may be used to determine the figure of merit at the parent nodes. In some embodiments, the child nodes in the second decision layer 306 are only determined only after the corresponding parent node is selected.

The example graph of FIG. 3 also includes a third decision layer 308, which the user can select to indicate whether the support structures that may have been added will be removed or retained. The node representing that the supports are to be retained is a leaf node. If the user selects the node indicating that supports are to be removed, additional child nodes may be generated to for a fourth decision layer 310. At the fourth decision layer 310, the user is prompted to indicate what types of SM capabilities are available or preferred.

The selection of a node at the fourth decision layer 310 provides a layer of leaf nodes 312 each represent a most suitable support removal strategy with regard to specific figures of merit given the selected SM capability. For example, as shown in FIG. 3, the leafs nodes may represent four different removal strategies, one that provides the fewest sets, one that provides the least estimated time, one for the least estimated cost, and one for the fewest head changes.

It will be appreciated that the particular print configuration graph is only one possible implementation of the present techniques and that various changes may be made while remaining within the scope of the present claims.

Figure 4A:
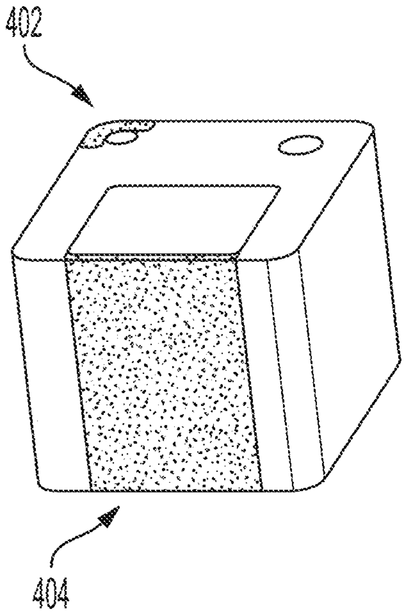
FIG. 4A is a perspective view of a visualization of an object model, in accordance with embodiments.
Figure 4B:
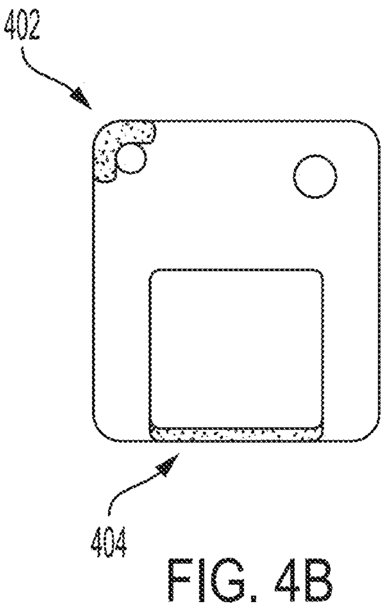
FIG. 4B is a top view of the object model shown in FIG. 4A.

FIG. 4A is a perspective view of a visualization of an object model, and FIG. 4B is a top view of the same object model. The object model may be the object model 116 shown in FIG. 1, and may be uploaded by the client device 122 to be processed by a configuration tool such as the HM configuration tool 104. The object model and any print configurations generated by the HM configuration tool may be displayed by the graphical user interface 124.

In some embodiments, the configuration tool may process the object model to identify features that are too small to print. This may be determined by comparing the size of features to a threshold size, which may vary depending on the type of 3D printer to be used to print the object. As shown in FIG. 4A, the configuration tool has identified two features as being too small to print. The first is a thin wall next to a hole, referred to as feature 402. The second is a thin wall adjacent to a rectangular opening, referred to as feature 404. The graphical user interface may highlight these features as shown for example in FIG. 4A to identify them to the user as being too thin. This may enable the user to modifying the shape of the object to eliminate the thin features.

Additionally, the HM configuration tool may be configured to automatically generate print configurations that eliminate the thin features. In some embodiments, a plurality of different configurations can be generated and evaluated to determine the values of various figures of merit for each configuration. Those configurations that are more suitable according to the figures of merit can be added to the print configuration graph and present to the user. The configurations tested may include any configuration that eliminates the thin feature and also comports with the input provided by the user regarding which surfaces may or may not be modified.

Figure 4C:
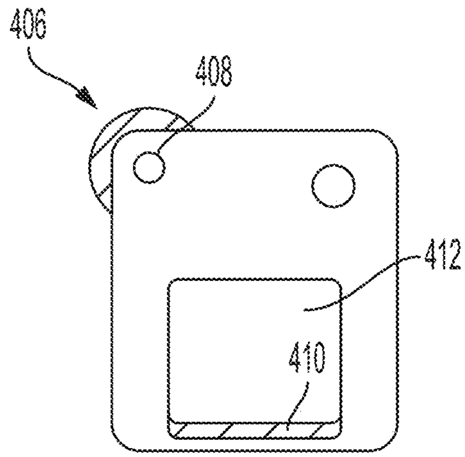
FIG. 4C is an example of a HM configuration that may be generated by the HM configuration tool, in accordance with embodiments.

FIG. 4C is an example of a HM configuration that may be generated by the HM configuration tool. The HM configuration shown in FIG. 4C may be added to the HM configuration graph and/or displayed to the user. In this example, the thin feature 402 has been eliminated by adding material 406 to the outer surface of the part. This solution may have been generated based on user input (received through the GUI) indicating the that the hole 408 is not modifiable. This solution may also be generated based on a determination by the configuration tool that the hole 408 was not accessible to SM processes and therefore the added material could not be removed. Absent user input indicating the hole could not be modified, the diameter of the hole could be reduced or the location of the hole could be moved toward the interior of the part.

The print configuration also shows that the thin feature 404 was solved by adding additional material 410 to the inside of the opening 412. Again, this solution may have been determined based on the user specifying the outer surface of the object as being modifiable, or by specifying the inner surface of the opening 412 as modifiable.

The solution shown in FIG. 4C could also be determined based on the user indicating which SM processes are available, and which SM processes would be cheaper or quicker to perform. For example, if the user indicated that drilling is available, a print configuration with a smaller hole diameter for hole 408 may be preferred since it may be inexpensive to remove the extra material after printing. Or if the user identified the outer surface of the part as being modifiable, such that the added material does not have to be removed, the solution shown in FIG. 4C may be less expensive. A wide variety of solutions may be possible, and the HM configuration tool can evaluate a large number of these solutions to determine which ones are the more efficient with regard to the various figures of merit. Each suitable print configuration can be displayed to the user via the GUI 124 to enable the user to make the final decision.

Figure 5A:
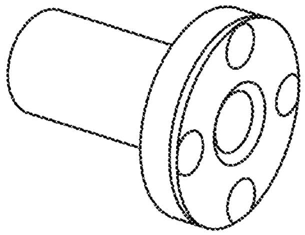
FIG. 5A is a perspective view of a visualization of another object model, in accordance with embodiments.

FIG. 5A is a perspective view of a visualization of another object model, in accordance with embodiments. The object model may be the object model 116 shown in FIG. 1, and may be uploaded by the client device 122 to be processed by a configuration tool such as the HM configuration tool 104. The object model and any print configurations generated by configuration tool the may be displayed by the graphical user interface 124.

In some embodiments, the configuration tool may process the object model to identify suitable orientations. This may be accomplished by reorienting the object model and determining the values for various figures of merit (cost, time to print, etc.) associated with each orientation.

Figure 5B:
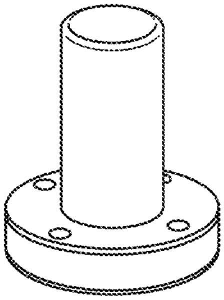
FIG. 5B is an example HM configuration generated from the object model shown in FIG. 5A.

FIG. 5B is an example HM configuration generated using from the object model shown in FIG. 5A. Specifically, FIG. 5B shows an orientation that results in the least amount of support structure material. With this orientation, no support structures are needed. This may also result in the lowest overall cost to manufacture, smallest amount of time to manufacture, etc. However, other orientations may actually be superior. For example, the overall height of the 3D object is increased, which may result in a longer 3D print time. Additionally, the user may identify this lengthwise orientation of the object as being the direction of highest tensile load. In some 3D manufacturing techniques, the vertical orientation relative to the build platform (i.e., the Z direction) is the orientation that provides the lowest material strength. Accordingly, the configuration tool may be configured to discard orientations wherein the direction of lower material strength aligns with the 3D object's direction of highest tensile load as shown in FIG. 5B.

Figure 5C:
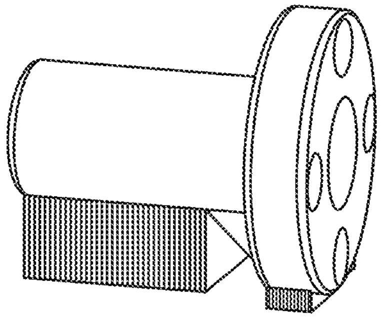
FIG. 5C shows another example HM configuration generated from the object model shown in FIG. 5A.

FIG. 5C shows another example HM configuration generated from the object model shown in FIG. 5A. In this example, the 3D object is in the original orientation and includes support structures to support overhangs. This print configuration may several advantages, including a reduced likelihood of failure, reduced time to print, and others. Other possible print configurations could include shape modifications to eliminate overhangs, thereby replacing of some or all of the support structures.

The configuration of FIG. 5C may also be determined based on part on the user identifying particular surfaces as being machine modified in a post printing process. For example, some surfaces of the part may be designated by the user as having a tight tolerance or a requirement for a specific quality of finish. In such cases, the incremental cost of removing support material from that surface may be reduced since the surface will be subject to post processing regardless. The user can also specify the type of post processing to be performed (type of tool, etc.). For example, the user may identify the outer circumference of the flange as being subject to post processing, such as a turning operation on a lathe. In that case, the additional of the support material may not have any significant effect on the post processing, and would therefore be preferable to changing the shape of the flange to a non-circular shape to remove the overhangs.

Additionally, the configuration tool may be configured to automatically generate a plurality of print configurations that eliminate overhangs. The print configurations can be evaluated to determine the values of various figures of merit for each configuration. Those configurations that are more suitable according to the figures of merit can be added to the print configuration graph (e.g., DAG 106) and presented to the user. The configurations tested may include any viable configuration that eliminates the overhangs and also comports with the input provided by the user regarding which surfaces may or may not be modified. A wide variety of solutions may be possible, and the configuration tool can evaluate a large number of these solutions to determine which ones are the most efficient with regard to the various figures of merit. Each suitable print configuration (including the 3D object and any computed figures of merit) can be displayed to the user via the GUI 124 to enable the user to make the final decision.

Figure 6:
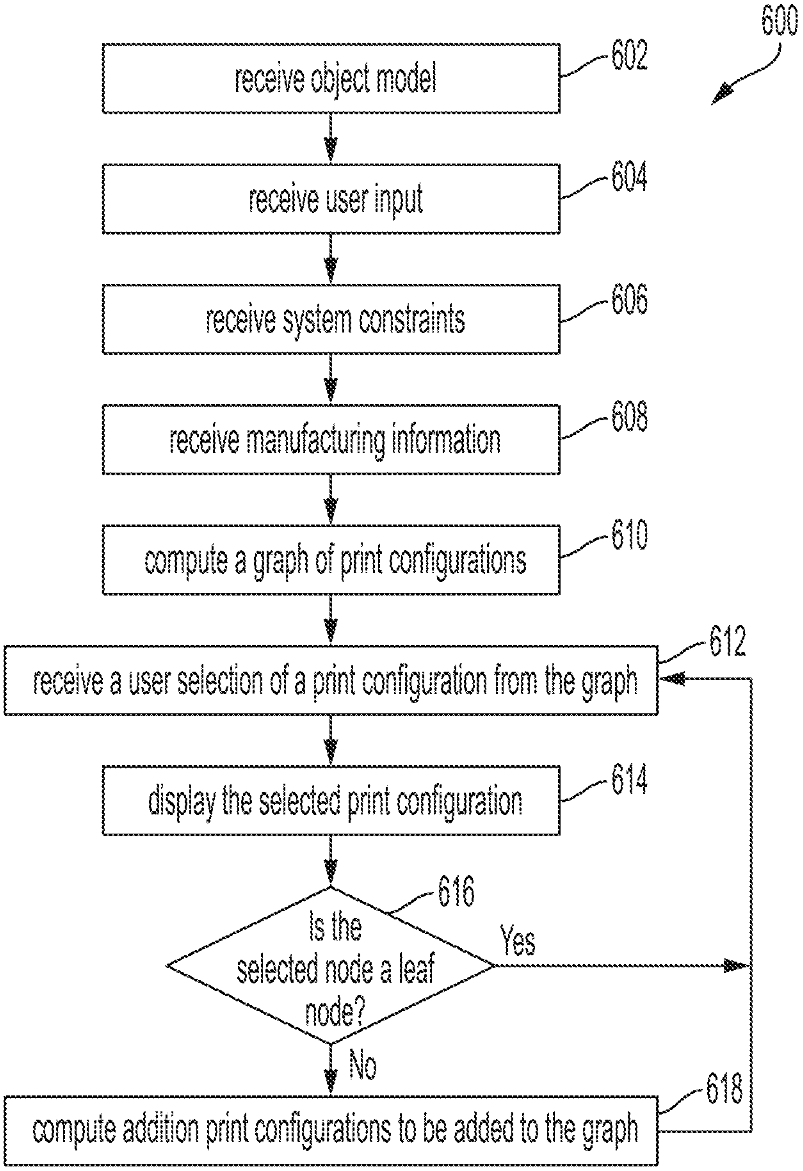
FIG. 6 is a process flow diagram for a method 600 of generating HM configurations used for printing a 3D object, in accordance with embodiments of the present disclosure.

FIG. 6 is a process flow diagram for a method 600 of generating HM configurations used for printing a 3D object, in accordance with embodiments of the present disclosure. The method may be performed by hardware or a combination of hardware and software. For example, the method may be performed by the HM configuration tool 104 executing the processing device 102. The method may begin at block 602.

At block 602, an object model is received. For example, the object model (e.g., object model 116) may be received from a user's remote computing device (e.g., client device 122) or retrieved from a storage device upon selection by the user for example. The object model may be a file, such as an STL file, CAD file, or others, that describes the shape of the 3D object to be printed.

At block 604, user input is received. The user input may relate to objectives of the user. For example, the user input may indicate surfaces of the 3D object that are modifiable and also specify an allowable direction for moving the surface and an allowable range of distances that the surface can be moved. The user input may also identify surfaces that cannot be modified and surfaces that will be subject to post processing, such as modification by one or more SM processes. The user input may also include a direction of tensile loading for the finished part. The user input may be received from a GUI (e.g., GUI 124) that is displaying the original object model.

At block 606, system constraints are received. The system constraints may describe limitations of the 3D printer and/or the SM tools or systems available. For example, the system constraints may describe the dimensions of a build platform, a tallest printable height, a smallest feature size, and others. Some or all of the system constraints may be input manually by the user. In some embodiments, the user may select a type of 3D printer and the system constraints may be populated automatically. The system constraints may also indicate that the user has access to a CNC machine, a dremel kit, drill press, lathe, or other post printing capabilities.

At block 608, manufacturing information is received. The manufacturing information may describe the cost of various materials that may be used in the 3D printing process, the time to 3D print an object, the time to perform various SM processes, labor costs, and any other factor that can affect the desirability of a particular HM solution for producing a part. The manufacturing information can be based on historical production information and can be used to compute figures of merit for various printing configurations.

At block 610, a graph of print configurations is computed based in part on the information received at blocks 602-608. The graph may be a directed acyclical graph such as the DAG 106 of FIG. 1. Each node of the graph may be a decision node or a leaf node. Decisions nodes may include a partial solution to a HM manufacturing problem. For example, a decision node may include reoriented object model, but no information about support structures or shape modifications. Another decision node may include support structures, but no information about how the support structures are to be removed. Leaf nodes may include a full HM manufacturing solution, which may include shape the printing orientation, shape modifications, support structure additions, post printing processes such as SM processes to be performed, and others.

Each node may also include values for various figures of merit, which may include cost to print, material cost, cost to remove material, overall cost, time to print, time to complete the finished product, likelihood of print job failure or part failure, and others. The figures of merit may be per part of per batch of parts. The graph generated at block 610 may be a full graph or partial graph. For example, some child nodes may only be generated after the parent node is selected by the user.

At block 612, a user selection of a particular print configuration may be received. In some embodiments, the user selection may be received through the GUI 124 by the user selecting an option corresponding with one of the child nodes of the node currently being viewed. For example, with reference to FIG. 3, if the user is currently viewing the print configuration associated with original object model 302, the user may be able to select a print configuration associated with any of the child nodes at the first decision level 304.

At block 614, the print configuration associated with the selected node is displayed to the user. The print configuration may be displayed by the GUI 124 and can include a visual representation of the object along with any numerical information related to the node, such as values for any of the figures of merit computed for the node.

At block 616, a determination is made regarding whether the selected node is a leaf node. A leaf node represents a full print configuration, i.e., a full solution to the HM matter, which can include all of selected changes to the object model that result in a viable print configuration as well as any selected post printing processes, e.g., SM processes. If the node is not a leaf node, then further configuration decisions have been undecided, and the process flow advances to block 618.

At block 618 additional print configurations may be added to the print configuration graph. For example, with reference to FIG. 3. If the user selects the "Naive Smallest Cost Orientation" node, then the HM configuration tool can determine that node's child nodes and add them to the graph. In some embodiments, the child nodes may have been precomputed and already part of the graph. In either case, the child nodes are presented to the user as additional feature selections. The process flow then returns to block 612, wherein a new user selection can be received and blocks 614, 616, and 618 can be repeated.

The method 600 may continue until a final print configuration is selected by the user. The final print configuration can be stored for later use or used to generate a work order, for example. In some embodiments, the GUI 124 may present an option to the user to send the selected print configuration to a 3D printer for printing, in which case the object model may be converted into a file, such as G-Code, compatible with the 3D printer.

It will be appreciated that embodiments of the method 600 may include additional blocks not shown in FIG. 6 and that some of the blocks shown in FIG. 6 may be omitted. Additionally, the processes associated with blocks 602 through 618 may be performed in a different order than what is shown in FIG. 6. For example, the GUI may enable the user to navigate in any direction through the graph. Nodes that have been generated may remain in place while the user backs out and navigates to different branches of the graph.

Figure 7:
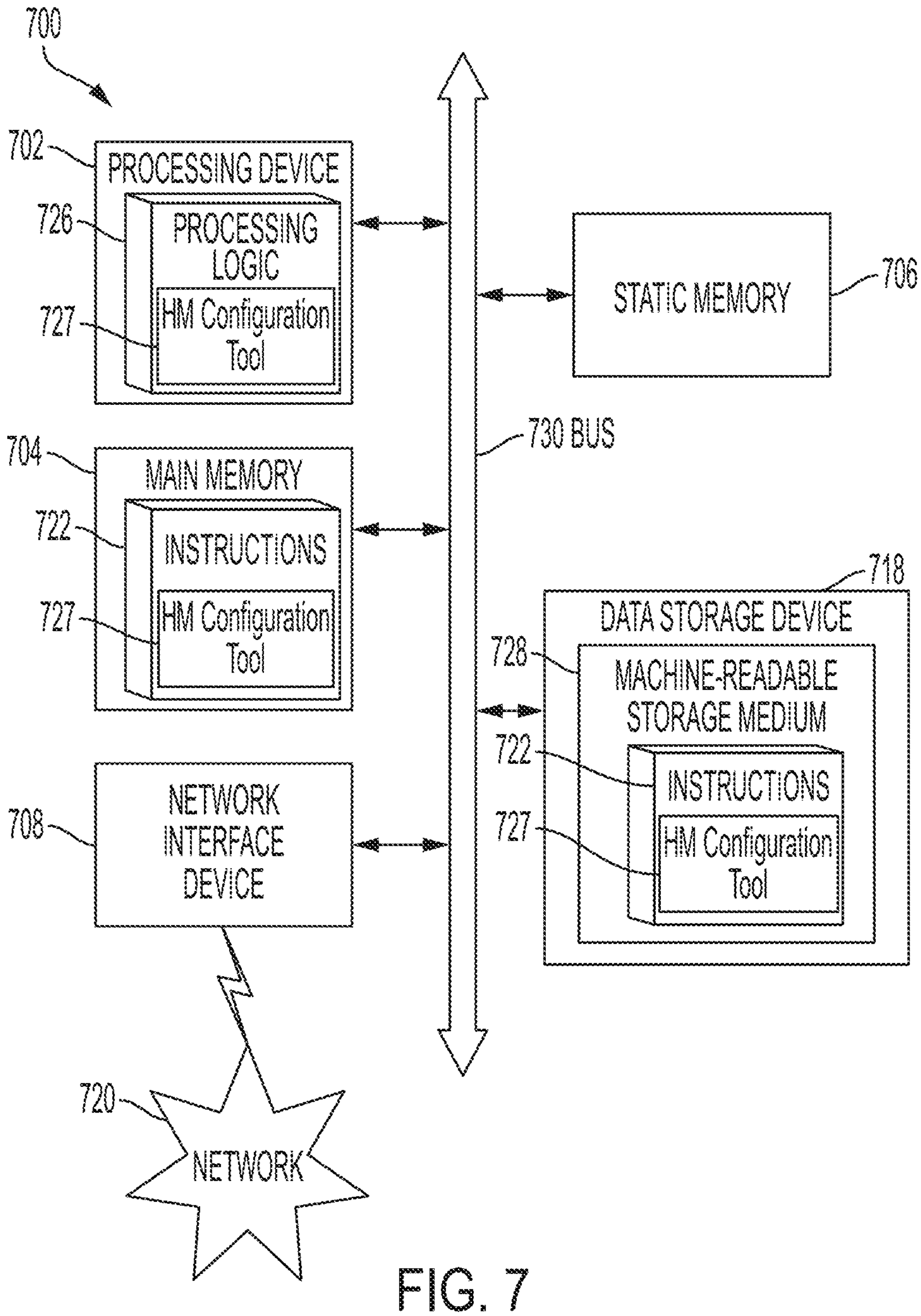
FIG. 7 illustrates an example computational device for performing operations to generate HM configurations, in accordance with certain aspects of the present disclosure.

FIG. 7 illustrates a diagrammatic representation of a machine in the example form of a computer system 700 within which a set of instructions 722 or processing logic 726, for causing the machine to perform any one or more of the methodologies discussed herein (such as the operations 600), may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server computer system, such as system 100.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. The processing logic 726 and/or the instructions 722 may include a HM configuration tool 727 which can be configured to enable the processing device 702 to perform any of the tasks associated with the HM configuration tool 104 or GUI or FIG. 1. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may execute processing logic 726, which may be one example of system 100 shown in FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute system 100. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein.

These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method of configuring for making a three-dimensional (3D) object by additive and subtractive hybrid manufacturing (HM), the method comprising:

receiving an object model of the 3D object, the object model being a computer aided design (CAD) file or a point cloud model;

obtaining user input parameters describing one or more user objectives, wherein the one or more user objectives comprises at least one of a modifiable surface of the 3D object or a direction of tensile loading of the 3D object;

computing, by a processing device, a directed acyclical graph (DAG) of HM configurations based on the user input parameters, wherein the DAG comprises a plurality of nodes corresponding to different configurations for manufacturing the 3D object, wherein the plurality of nodes comprises values for two or more figures of merit including cost to print, material cost, cost to remove material, overall cost, time to print, time to complete, and likelihood of print job failure or part failure, and the plurality of nodes comprises a root node representing an original object model and a leaf node representing an HM solution of a Pareto efficient solution for the one or more user objectives;

displaying a selected HM configuration corresponding to a selected node corresponding to the leaf node of the plurality of nodes; and sending the selected HM configuration to a 3D printer for printing.

2. The method of claim 1, wherein each node corresponds to a vertex of a Pareto front with respect to the two or more figures of merit.

3. The method of claim 1, comprising displaying values of the two or more figures of merit for the selected HM configuration.

4. The method of claim 1, wherein the two or more figures of merit comprise a cost to print the 3D object, a time to print the 3D object, a material removal cost, a material removal time, or any combination thereof.

5. The method of claim 1, wherein the selected node comprises two or more sub-nodes, the method further comprising:

enabling the user to select a target node of the two or more sub nodes; and displaying an additional HM configuration corresponding to the target node.

6. The method of claim 1, wherein the user input parameters comprise user selected portions of the 3D object that the user has identified as allowed or disallowed for having a support structure attached.

7. The method of claim 1, wherein the user input parameters comprise user selected portions of the 3D object that the user has identified to be machine modified in a post printing process.

8. The method of claim 1, wherein the user input parameters comprise user selected portions of the 3D object that the user has identified as being allowed or disallowed to modify a shape of the 3D object.

9. The method of claim 1, wherein computing the graph comprises computing the graph based in part on system constraints, wherein the system constraints comprise an overhang support threshold, a minimum feature size, or both.

10. The method of claim 1, comprising printing the 3D object using a final HM configuration selected by the user.

11. An apparatus for configuring for making a three dimensional (3D) object by additive and subtractive hybrid manufacturing (HM), the apparatus comprising:

a memory;

a processing device operatively coupled to the memory, the processing device to:

receive an object model of the 3D object, the object model being a computer aided design (CAD) file or a point cloud model;

obtain user input parameters describing one or more user objectives, wherein the one or more user objectives comprises at least one of a modifiable surface of the 3D object or a direction of tensile loading of the 3D object;

compute a directed acyclical graph (DAG) of hybrid manufacturing (HM) configurations based on the user input parameters, wherein the DAG comprises a plurality of nodes corresponding to different configurations for manufacturing the 3D object, wherein the plurality of nodes comprises values for two or more figures of merit including cost to print, material cost, cost to remove material, overall cost, time to print, time to complete, and likelihood of print job failure or part failure, and the plurality of nodes comprises a root node representing an original object model and a leaf node representing an HM solution of a Pareto efficient solution for the one or more user objectives;

display a selected HM configuration corresponding to a selected node corresponding to the leaf node of the plurality of nodes; and sending the selected HM configuration to a 3D printer for printing.

12. The apparatus of claim 11, wherein each node corresponds to a vertex of a Pareto front with respect to the two or more figures of merit.

13. The apparatus of claim 11, the processing device further to display values of the two or more figures of merit for the selected HM configuration.

14. The apparatus of claim 11, wherein the two or more figures of merit comprise a cost to print the 3D object, a time to print the 3D object, a material removal cost, a material removal time, or any combination thereof.

15. The apparatus of claim 11, wherein the selected node comprises two or more sub-nodes, the processing device further to:

enable the user to select a target node of the two or more sub nodes; and display an additional print configuration corresponding to the target node.

16. The apparatus of claim 11, wherein the user input parameters comprise user selected portions of the 3D object that the user has identified as allowed or disallowed for having a support structure attached.

17. The apparatus of claim 11, wherein the user input parameters comprise user selected portions of the 3D object that the user has identified to be machine modified in a post printing process.

18. The apparatus of claim 11, wherein the user input parameters comprise user selected portions of the 3D object that the user has identified as being allowed or disallowed to modify a shape of the 3D object.

19. The apparatus of claim 11, wherein the processing device is to compute the graph based in part on system constraints, wherein the system constraints comprise an overhang support threshold, a minimum feature size, or both.

20. A non-transitory computer-readable storage medium having instructions stored thereon that, when executed by a processing device, cause the processing device to:

receive an object model of a three dimensional (3D) object, the object model being a computer aided design (CAD) file or a point cloud model;

obtain user input parameters describing one or more user objectives, wherein the one or more user objectives comprises at least one of a modifiable surface of the 3D object or a direction of tensile loading of the 3D object;

compute a directed acyclical graph (DAG) of hybrid manufacturing (HM) configurations based on the user input parameters, wherein the DAG comprises a plurality of nodes corresponding to different configurations for manufacturing a 3D object, wherein the plurality of nodes comprises values for two or more figures of merit including cost to print, material cost, cost to remove material, overall cost, time to print, time to complete, and likelihood of print job failure or part failure, and the plurality of nodes comprises a root node representing an original object model and a leaf node representing an HM solution of a Pareto efficient solution for the one or more user objectives;

display a selected HM configuration corresponding to a selected node corresponding to the leaf node of the plurality of nodes; and send the selected HM configuration to a 3D printer for printing.

* * * * *